(12) United States Patent
Adams et al.

(10) Patent No.: US 11,964,459 B1
(45) Date of Patent: Apr. 23, 2024

(54) SYSTEMS AND METHODS FOR REMOVING A BACKING FROM A PLY OF COMPOSITE MATERIAL

(71) Applicant: The Boeing Company, Chicago, IL (US)

(72) Inventors: Travis R. Adams, Villa Ridge, MO (US); Charles A. Rhodes, O'Fallon, MO (US); Benjamin Richards, St. Louis, MO (US); Juliette Dubon, Miami Lakes, FL (US); Adam Martinez, St. Louis, MO (US); Eric E. Moyes, Desoto, MO (US); Timothy J. Luchini, St. Louis, MO (US); Augustus J. Ellis, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/046,552

(22) Filed: Oct. 14, 2022

(51) Int. Cl.
*B32B 43/00* (2006.01)
*B29C 70/54* (2006.01)

(52) U.S. Cl.
CPC ............ *B32B 43/006* (2013.01); *B29C 70/54* (2013.01); *Y10T 156/1132* (2015.01); *Y10T 156/1153* (2015.01); *Y10T 156/1174* (2015.01); *Y10T 156/1911* (2015.01); *Y10T 156/1944* (2015.01); *Y10T 156/195* (2015.01)

(58) Field of Classification Search
CPC ............ B32B 43/006; Y10T 156/1132; Y10T 156/1153; Y10T 156/1174; Y10T 156/1911; Y10T 156/1944; Y10T 156/195
See application file for complete search history.

(56) References Cited

U.S. PATENT DOCUMENTS

| 5,891,297 | A | * | 4/1999 | Stadtmueller | B29C 63/0013 156/763 |
| 9,358,770 | B2 | | 6/2016 | Dong et al. | |
| 9,517,615 | B2 | | 12/2016 | Dong et al. | |
| 10,207,487 | B1 | | 2/2019 | Hockemeyer et al. | |
| 2008/0185100 | A1 | * | 8/2008 | Jang | G02F 1/1303 156/759 |
| 2008/0236743 | A1 | * | 10/2008 | Kye | B29C 63/0013 156/759 |
| 2009/0127374 | A1 | | 5/2009 | Kramp et al. | |
| 2009/0288760 | A1 | * | 11/2009 | Garben | B41J 29/38 156/350 |

(Continued)

FOREIGN PATENT DOCUMENTS

| EP | 3 647 031 | 5/2020 |
| GB | 2 490 152 | 10/2012 |

OTHER PUBLICATIONS

European Patent Office, "Partial European Search Report," App. No. 23193290.6 (Feb. 21, 2024).

*Primary Examiner* — Philip C Tucker
*Assistant Examiner* — Nickolas R Harm
(74) *Attorney, Agent, or Firm* — Walters & Wasylyna LLC

(57) ABSTRACT

A system and method for removing a backing from a ply of composite material is disclosed. The system includes a roller having a roller axis and a roller surface that circumscribes the roller axis. The system also includes an adhesion feature disposed on the roller surface. The system further includes a roller drive to move the roller along a travel path that is perpendicular to the roller axis and to rotate the roller about the roller axis.

20 Claims, 11 Drawing Sheets

(56) References Cited

U.S. PATENT DOCUMENTS

| | | | |
|---|---|---|---|
| 2012/0227909 A1* | 9/2012 | Schindler | H01L 21/67132 |
| | | | 156/707 |
| 2015/0101759 A1* | 4/2015 | Lee | B32B 38/10 |
| | | | 156/760 |
| 2015/0309341 A1* | 10/2015 | Zhang | G02F 1/1309 |
| | | | 445/2 |
| 2016/0193822 A1* | 7/2016 | Ni | B32B 43/006 |
| | | | 156/759 |
| 2018/0117896 A1* | 5/2018 | Peng | H10K 71/00 |
| 2020/0254701 A1 | 8/2020 | Modin et al. | |
| 2020/0298547 A1* | 9/2020 | Pierce | B65H 41/00 |

* cited by examiner

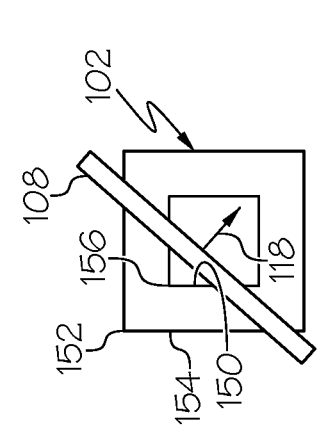
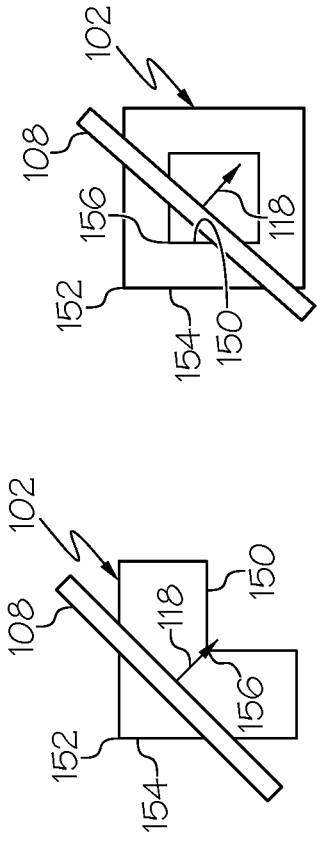
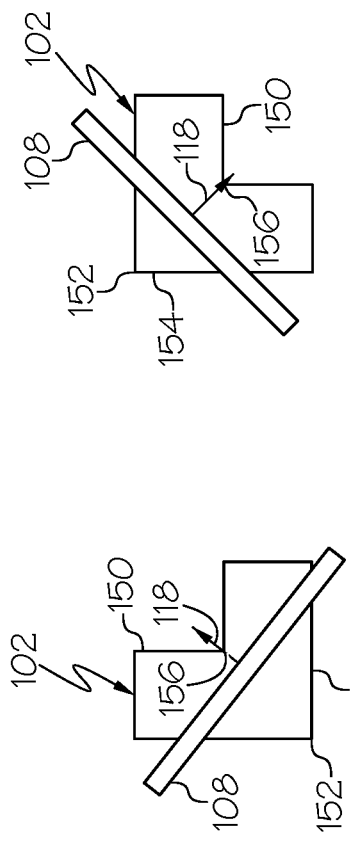
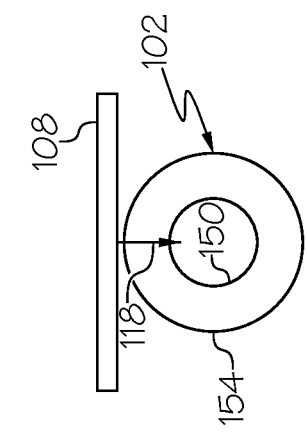
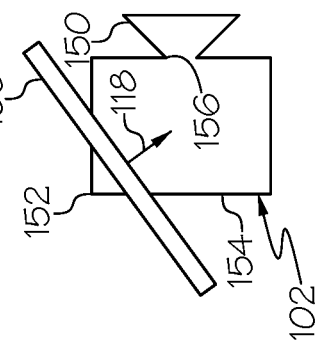
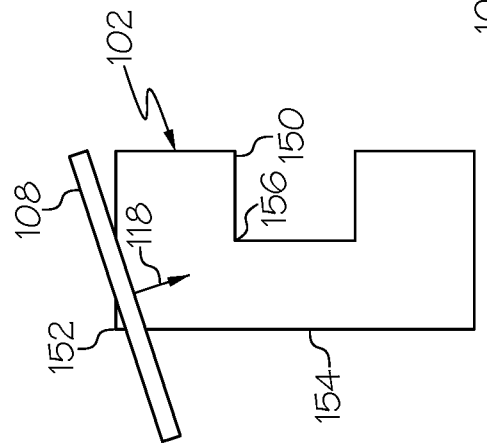
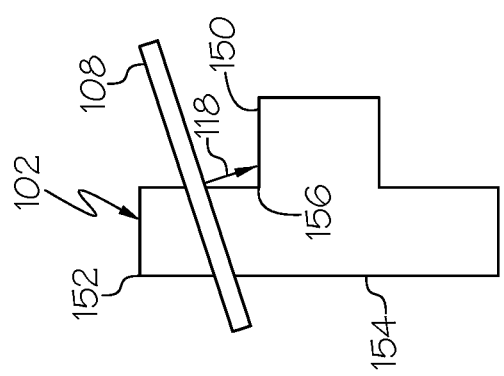

SYSTEMS AND METHODS FOR REMOVING A BACKING FROM A PLY OF COMPOSITE MATERIAL

FIELD

The present disclosure relates generally to composite manufacturing and, more particularly, to systems and methods for removing backing material from a surface of a ply of composite material.

BACKGROUND

Composite products can be made from plies of pre-impregnated, or pre-preg, material. A pre-preg material includes fiber reinforcement material surrounded by matrix material. A ply of pre-preg material is typically provided with a backing material on one or both sides to protect the ply from damage and contamination during transit and preparation. Accordingly, there is a need to remove the backing material prior to laying-up the ply. However, removal of the backing material is a complex operation that is difficult to automate. As such, the backing material is typically removed by hand, which is time and labor intensive. Accordingly, those skilled in the art continue with research and development efforts in the field of composite manufacturing and, more particularly, removal of a backing material from a pre-preg composite material.

SUMMARY

Disclosed are examples of a system for removing a backing from a ply of composite material and methods for removing a backing from a ply of composite material. The following is a non-exhaustive list of examples, which may or may not be claimed, of the subject matter according to the present disclosure.

In an example, the disclosed system includes a roller having a roller axis and a roller surface that circumscribes the roller axis. The system also includes an adhesion feature disposed on the roller surface. The system further includes a roller drive to move the roller along a travel path that is perpendicular to the roller axis and to rotate the roller about the roller axis.

In an example, the disclosed method includes steps of: (1) positioning a roller in contact with a backing, coupled to a ply of composite material; (2) adhering a roller surface of the roller to a portion of the backing; (3) moving the roller along a travel path while rotating the roller about a roller axis; and (4) wrapping the backing around the roller surface to peel the backing away from the ply.

In another examples, the disclosed method includes steps of: (1) applying an adhesion force to a backing surface of a backing, coupled to a ply of composite material; (2) producing a static friction force, applied to the backing surface via the adhesion force; (3) directing the static friction force along a cycloidal path; and (4) producing a peel force, applied to the backing via the adhesion force and the static friction force. The peel force is sufficient to remove the backing from the ply.

Other examples of the disclosed system and methods will become apparent from the following detailed description, the accompanying drawings, and the appended claims.

BRIEF DESCRIPTION OF THE DRAWINGS

FIG. 13A-13G schematically illustrate examples of travel path of the roller of the system of FIG. 1;

DETAILED DESCRIPTION

Referring generally to FIGS. 1-15, the present disclosure is directed to systems and methods for removing a backing material from a composite material. More particularly, the present disclosure is directed to a system 100 (FIG. 1), a method 1000 (FIG. 2), and a method 2000 (FIG. 3) for at least partially automating the removal of a backing 102 from a ply 104 of composite material 106.

Figure 1:
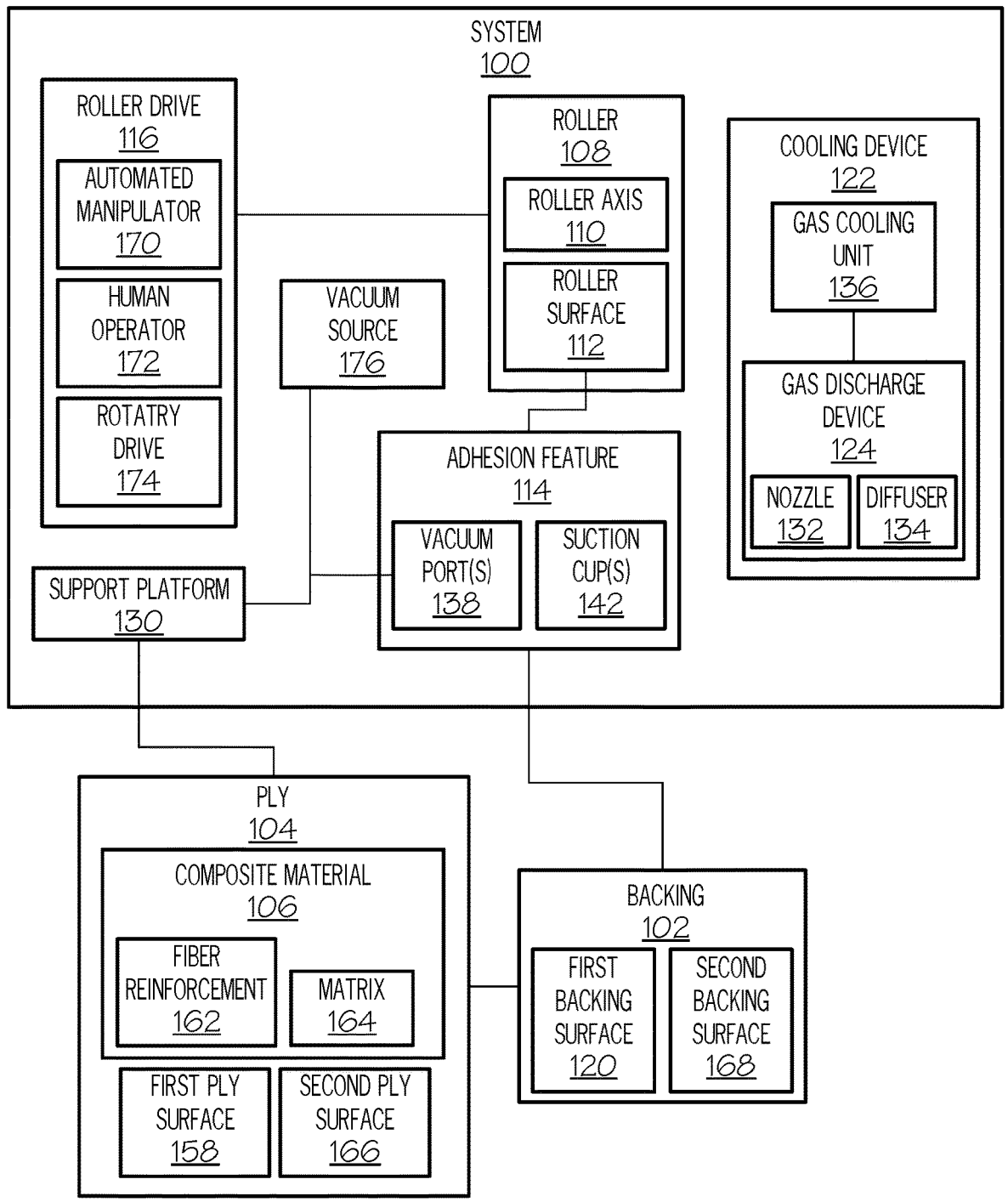
FIG. 1 a schematic block diagram of a system for removing a backing from a ply of composite material.

Referring to FIG. 1, the composite material 106 refers to an uncured composite material and generally includes any suitable base materials used in composite manufacturing. In one or more examples, the composite material 106 includes a fiber reinforcement 162 and a matrix 164. In one or more examples, the composite material 106 may also include one or more additives, such as, but not limited to, thermoplastic toughening additives, curing agents, binders, and the like.

The fiber reinforcement 162 includes any suitable type of reinforcement material, such as carbon fiber, glass fiber, aramid fiber, etc., having any suitable form, such as woven, nonwoven, fabric, tape, etc. The matrix 164 includes any suitable type of the matrix material, such as resin, epoxy, polymer, thermoplastic, thermoset, ceramic, etc.

In one or more examples, the composite material 106 includes the fiber reinforcement 162 that is pre-impregnated with the matrix 164, also referred to as a pre-preg. The ply 104 refers to or includes a single layer of the composite material 106, such as a single sheet of pre-preg material (e.g., fiber reinforcement 162 pre-impregnated with matrix 164). Accordingly, throughout the present disclosure, the composite material 106 may refer to or may be referred to as a preg-preg composite material or a pre-preg.

The ply 104 of the composite material 106 (pre-preg) is provided with the backing 102. The backing 102 is attached to one or both surfaces (e.g., sides) of the ply 104. Generally, the backing 102 includes a first backing surface 120 and a second backing surface 168, opposite the first backing surface 120. The second backing surface 168 is attached to and covers the surface of the ply 104 and the first backing surface 120 is exposed.

In one or more examples, the backing 102 is attached to a first ply surface 158 and/or a second ply surface 166 of the ply 104. As illustrated in FIGS. 4, 5, 14 and 15, in one or more examples, a first backing 102A is attached to and covers the first ply surface 158 of the ply 104 and a second backing 102B is attached to and covers the second ply surface 166 of the ply 104.

The backing 102 is made of any suitable backing material, such as coated paper, polyethylene, and the like. Generally, the backing 102 is adhered to the surface of the ply 104, such as by use of an adhesive, via the inherent tackiness of the matrix 164 of the composite material 106, or a combination thereof.

The backing 102 protects the composite material 106 from damage and contamination while the ply 104 is being moved, cut, and otherwise prepared for a lay-up operation. The backing 102 is removed from the ply 104 before lay-up. Conventional removal of the backing 102 is performed manually (i.e., by hand). Manual removal of the backing 102 may be required due to various factors, such as variations in the magnitude of a peel force required to initiate and/or complete removal of the backing 102, variations in the geometry of the ply 104 and backing 102, and other variations that present challenges to repeatability.

The present disclosure also recognizes that pick-and-place machinery is used to automate the ply-by-ply lay-up operation during composite manufacturing. However, removal of the backing 102 prior to lay-up is difficult to automate due to challenges in replicating tasks performed by the human hand, variations in the geometry of the ply 104, variations in the type of pre-preg composite material, and the like. The system 100, the method 1000, and the method 2000 disclosed herein advantageously solve the above-mentioned challenges in automating removal of the backing 102. Additionally, the system 100, the method 1000, and the method 2000 disclosed herein are applicable to both hand lay-up operations and automated lay-up operations.

Figure 6:
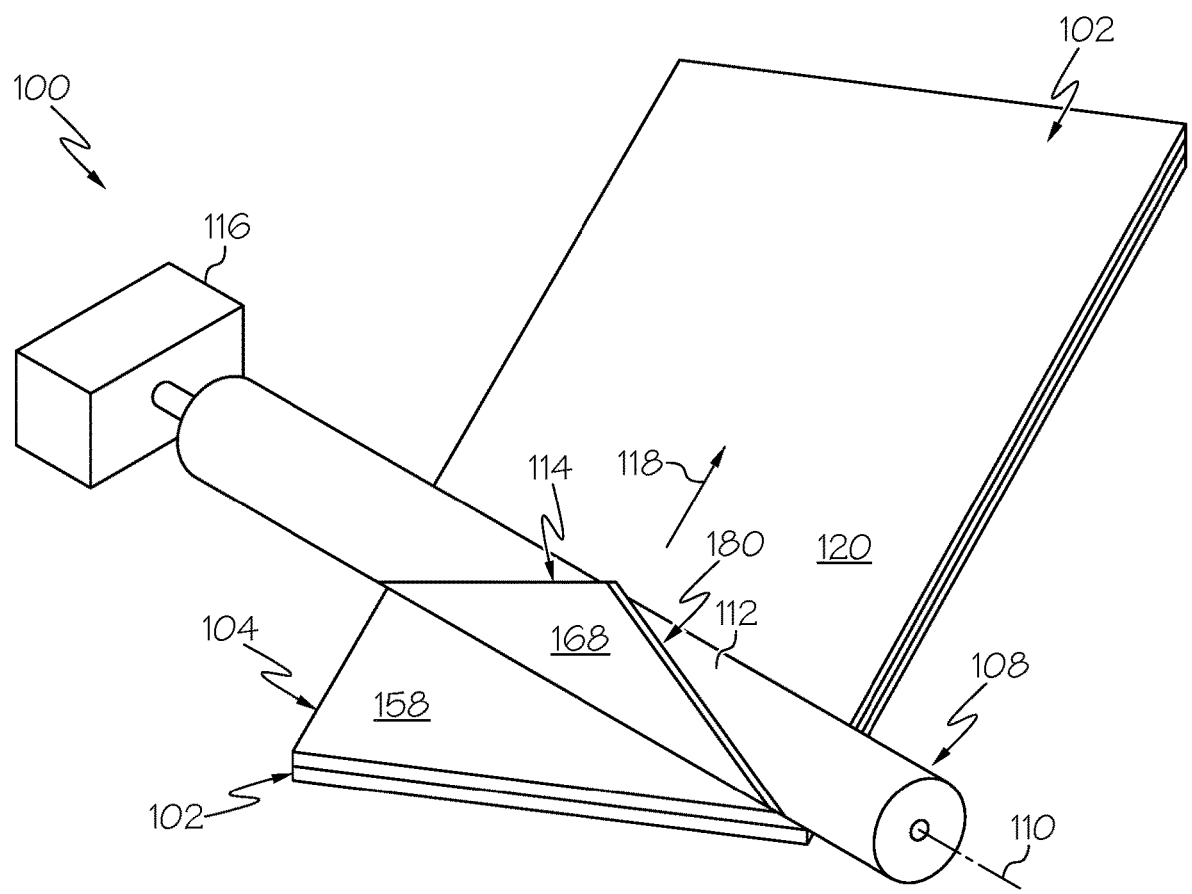
FIG. 6 is a schematic, perspective view of an example of the system of FIG. 1.

Referring now to FIGS. 1 and 6, which schematically illustrate examples of the system 100. In one or ore examples, the system 100 includes a roller 108. The roller 108 includes a roller axis 110 and a roller surface 112 that circumscribes the roller axis 110. The system 100 also includes an adhesion feature 114. The adhesion feature 114 is disposed on the roller surface 112. The system 100 further includes a roller drive 116. The roller drive 116 is configured to move the roller 108 along a travel path 118 (FIG. 6). The travel path 118 of the roller 108 is perpendicular to the roller axis 110. The roller drive 116 is also configured to rotate the roller 108 about the roller axis 110.

In one or more examples, the roller surface 112 is configured to contact the first backing surface 120 of the backing 102. The adhesion feature 114 is configured to procure adhesion between the roller surface 112 and a portion of the first backing surface 120. Rotation of the roller 108 during movement of the roller 108 along the travel path 118 peels the backing 102 away from the ply 104 and wraps the backing 102 around the roller 108.

Referring to FIGS. 4, 5, 14 and 15, in one or more examples, the first backing 102A is attached to the ply 104. During removal of the first backing 102A, the roller surface 112 contacts the first backing surface 120A of the first backing 102A. The second backing surface 168A of the first backing 102A is in contact with and is attached to the first ply surface 158 of the ply 104.

During removal of the backing 102, the roller 108 places a continuous downward force (e.g., first force F1 shown in FIGS. 4 and 5) along a contact interface 128 between a portion of the roller 108 and a portion of the backing 102. The roller 108 is elongated along its length such that the contact interface 128 is similarly elongated across the first backing surface 120 of the backing 102.

The continuous downward force (e.g., first force F1 shown in FIGS. 4 and 5), applied along the length of the roller 108 and between the roller 108 and the backing 102, is distributed along the contact interface 128 and, therefore, provides a more efficient and repeatable solution as compared to a force applied at a single point of contact on the backing 102. The continuous downward force provided along the length of the roller 108 advantageously holds the ply 104 in place (e.g., prevents lift-up) and does not disturb the underlying composite material 106 of the ply 104 while removing the backing 102. The continuous downward force provided along the length of the roller 108 also minimizes the likelihood of tearing the backing 102 during removal.

Figure 4:
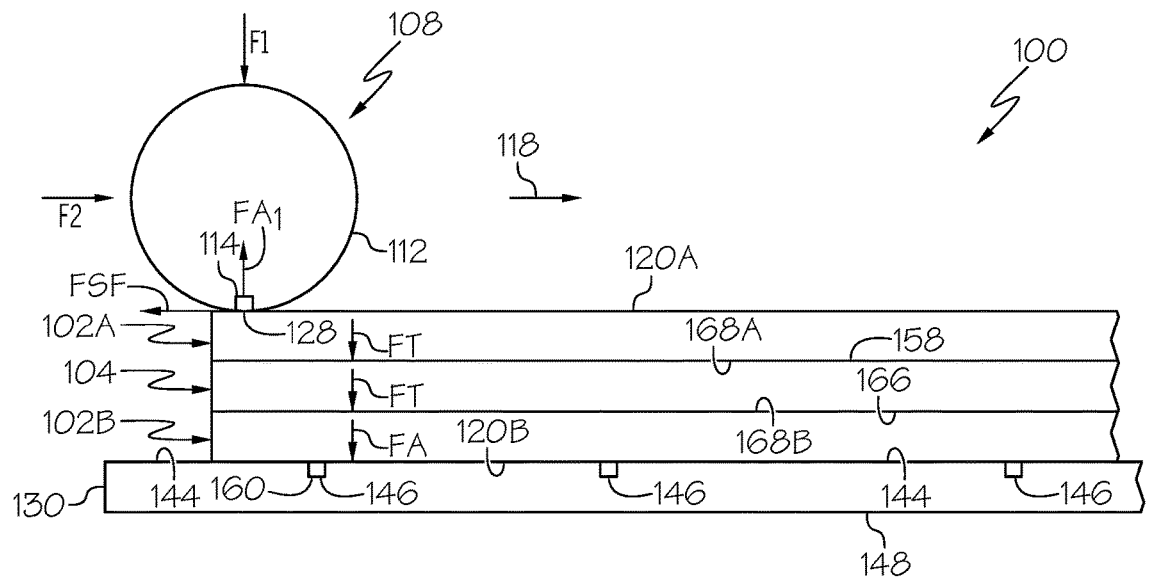
FIG. 4 is a schematic, side view of an example of the system of FIG. 1.
Figure 5:
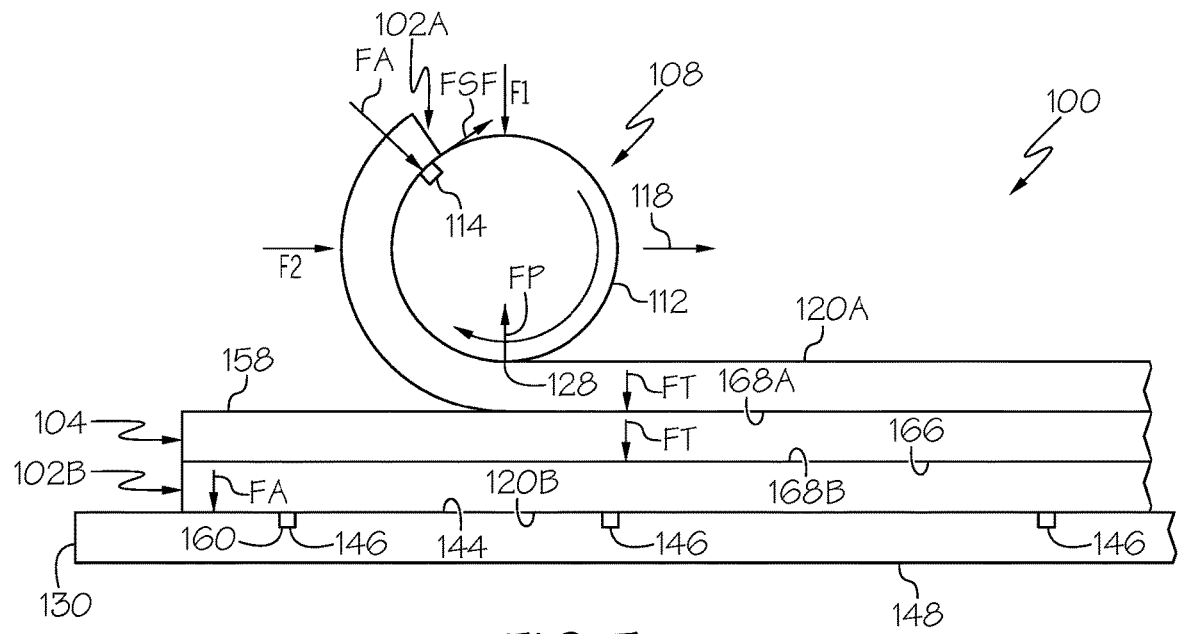
FIG. 5 is a schematic, side view of an example of the system of FIG. 1.

Referring to FIG. 1 and to FIGS. 4 and 5, in one or more examples, the roller drive 116 is configured to apply a first force F1 (FIGS. 4 and 5) to the roller 108. The first force F1 is perpendicular to the roller axis 110. The roller drive 116 is configured to apply a second force F2 (FIGS. 4 and 5) to the roller 108. The second force F2 is perpendicular to the roller axis 110 and to the first force F1.

Generally, the first force F1 is directional force applied to the roller 108, which is transferred to the backing 102 and the ply 104 via the roller 108 along the contact interface 128. The second force F2 is a directional force applied to the roller 108 for moving the roller 108 along the travel path 118 across the ply 104 while removing the backing 102.

In one or more examples, as illustrated in FIGS. 4 and 5, the ply 104 is supported by a support platform 130 and is presented in an approximately horizontal orientation. As such, in these examples, the first force F1 is a vertical (e.g., downward) force and the second force F2 is a horizontal force. However, the direction of the first force F1 and the second force F2 are not limited to the illustrated examples and can vary depending upon the angular orientation of the ply 104 during removal of the backing 102. For example, the ply 104 may be supported by the support platform 130 and presented in an approximately vertical orientation. In these examples, the first force F1 is a horizontal force and the second force F2 is a vertical force.

Referring again to FIG. 1, the roller drive 116 includes any suitable force transmission and/or motion transmission device capable of pressing the roller 108 against the backing 102 and rotating the roller 108 while moving the roller 108 along the travel path 118. The roller drive 116 can be fully automated or partially automated.

In one or more examples, the roller drive 116 includes or takes the form of an automated manipulator 170 (FIG. 1), such as a robotic arm. The automated manipulator 170 is coupled to the roller 108, for example, by any suitable fixture or end effector, such that the roller 108 is rotatable about the roller axis 110. The automated manipulator 170 has multiple degrees of freedom and is programmable to automatically move along a predefined program path. In these examples, the automated manipulator 170 applies a force to the roller 108 resulting in the first force F1 to press the roller 108 against the backing 102 and the second force F2 to move the roller 108 along the travel path 118. In one or more examples, rotation of roller 108 is achieved passively as a result of a combination of the first force F1, the second force F2, and a friction force between the roller 108 and the backing 102.

In one or more examples, the roller drive 116 includes or takes the form of a human operator 172. The human operator 172 holds the roller 108, for example, by any suitable fixture, such that the roller 108 is rotatable about the roller axis 110. In these examples, the human operator 172 applies a force to the roller 108 resulting in the first force F1 to press the roller 108 against the backing 102 and the second force F2 to move the roller 108 along the travel path 118. In one or more examples, rotation of roller 108 is achieved passively as a result of a combination of the first force F1, the second force F2, and a friction force between the roller 108 and the backing 102.

In one or more examples, the roller drive 116 includes or takes the form of a rotary drive 174. The rotary drive 174 is coupled to the roller 108 and is configured to drive rotation of the roller 108 about the roller axis 110. The rotary drive 174 includes any suitable rotary drive or actuator (e.g., electromechanical, pneumatic, hydraulic). In these examples, rotation of roller 108 is achieved actively by operation of the rotary drive 174. In these examples, the roller drive 116 includes another component (e.g., the automated manipulator 170 or the human operator 172) that applies at least the first force F1 to press the roller 108 against the backing 102. In one or more examples, movement of the roller 108 along the travel path 118 is achieved passively as a result of a combination of the first force F1, a rotational force applied to the roller 108, and a friction force between the roller 108 and the backing 102. In one or more examples, movement of the roller 108 along the travel path 118 is achieved actively as a result of a combination of the first force F1, the second force F2, and the rotational force applied to the roller 108.

In one or more examples, the roller drive 116 includes a combination of the automated manipulator 170, the human operator 172, and/or the rotary drive 174 to achieve the first force F1 for pressing the roller 108 against the backing 102, the second force F2 for moving the roller 108 along the travel path 118, and the rotational force for rotating the roller 108 about the roller axis 110. Advantages of using the rotary drive 174 include assistance in motion of the roller 108 along the travel path 118 and the ability to remove (e.g., unwind) the backing 102 from the roller 108 after removal by reversing rotational motion of the roller 108 using the rotary drive 174.

Figure 7:
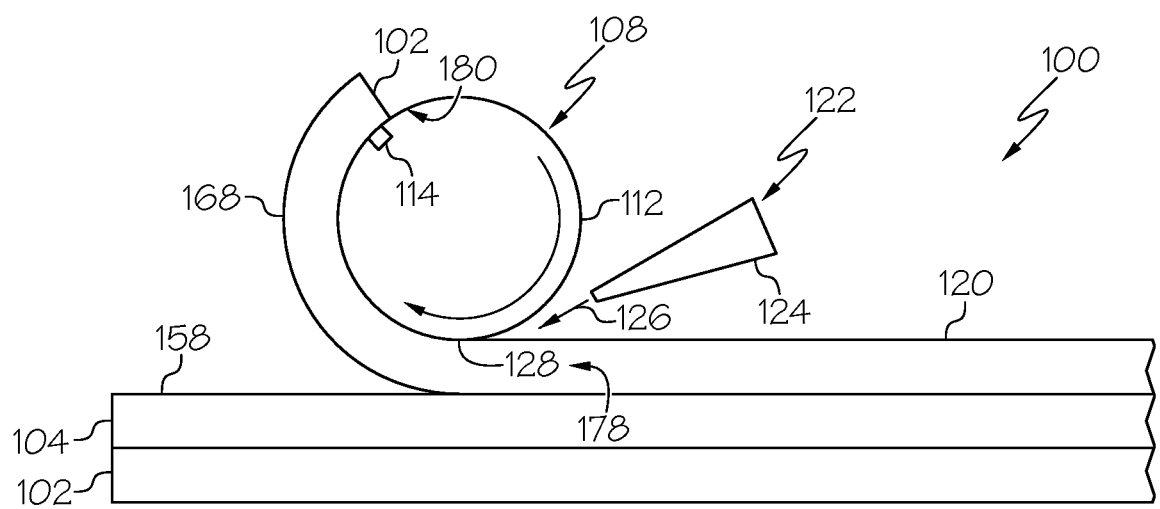
FIG. 7 is a schematic, side view of an example of the system of FIG. 1.
Figure 8:
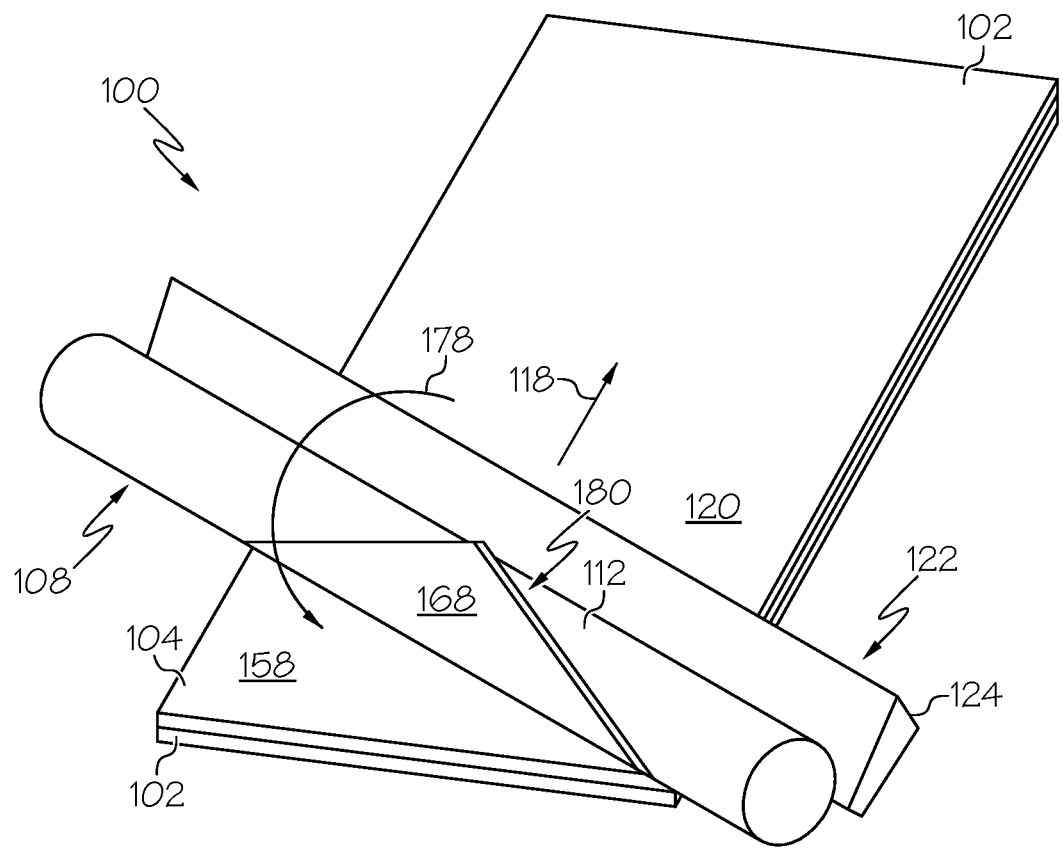
FIG. 8 is a schematic, perspective view of an example of the system of FIG. 1.

Referring to FIG. 1 and to FIGS. 7 and 8, in one or more examples, the system 100 includes a cooling device 122. The cooling device 122 is configured to reduce a temperature 178 (FIGS. 7 and 8) of at least one of the backing 102 and/or the ply 104. Reducing the temperature 178 of at least one of the backing 102 and/or the ply 104 reduces a tension force or tack force FT (FIGS. 4 and 5), such as a first tack force FT1 (FIGS. 14 and 15), between the backing 102 and the ply 104. For example, reducing the temperature 178 of the backing 102 and the ply 104 reduces the tackiness or degree of adhesion of the matrix 164. Therefore, reducing the temperature 178 of the backing 102 and/or the ply 104 and, thereby, the tack force FT, reduces the magnitude of a peel force FP (FIGS. 5 and 15) required to remove the backing 102 from the ply 104.

In one or more examples, the cooling device 122 includes a gas discharge device 124. In one or more examples, the cooling device 122, such as the gas discharge device 124, is located adjacent to the roller 108. In one or more examples, the cooling device 122, such as the gas discharge device 124, moves along the travel path 118 ahead of the roller 108.

In one or more examples, the gas discharge device 124 is configured to dispense a chilled gas 126 (FIG. 7) along the contact interface 128 between the roller surface 112 of the roller 108 and the first backing surface 120 of the backing 102. The chilled gas 126 reduces the temperature 178 of the backing 102 and/or the ply 104 along the contact interface 128. In one or more examples, the chilled gas 126 is cold air. In one or more examples, the chilled gas 126 is ionized to reduce static electricity.

Referring to FIG. 1, in one or more examples, the gas discharge device 124 includes or takes the form of a nozzle 132. The nozzle 132 increases a velocity of the chilled gas 126 directed at the backing 102 and the ply 104.

In one or more examples, the gas discharge device 124 includes or takes the form of a diffuser 134. The diffuser 134 decreases a velocity of the chilled gas 126 directed at the backing 102 and the ply 104.

In one or more examples, the gas discharge device 124 is elongated and has a length at approximately equal to the length of the roller 108 to dispenses the chilled gas 126 along a majority or an entirely of the contact interface 128. In one or more examples, the gas discharge device 124 has a length that is less than the length of the roller 108. In these examples, the gas discharge device 124 is configured to move along the roller 108 (e.g., parallel to the roller axis 110) to dispense the chilled gas 126 along the contact interface 128.

In one or more examples, the cooling device 122 includes a gas cooling unit 136. The gas cooling unit 136 is configured to reduce a temperature of the chilled gas 126, which is dispensed or discharged by the gas discharge device 124. The gas cooling unit 136 includes or takes the form of any suitable refrigeration unit, heat exchanger (e.g., liquid or gas), and the like.

In other examples, the cooling device 122 is incorporated into at least one of the roller 108 and/or the support platform 130. As an example, the cooling device 122 includes or takes the from of a heat exchanger or heat sink situated within a body of the roller 108 that is configured to actively cool the roller 108, thereby, reducing the temperature 178 of the backing 102 and/or the ply 104 along the contact interface 128. As another example, the cooling device 122 includes or takes the form of a chilled gas discharge device, heat exchanger, or heat sink situated within a body of the support platform 130 that is configured to actively cool the support platform 130, thereby, reducing the temperature 178 of the backing 102 and/or the ply 104.

Figure 9:
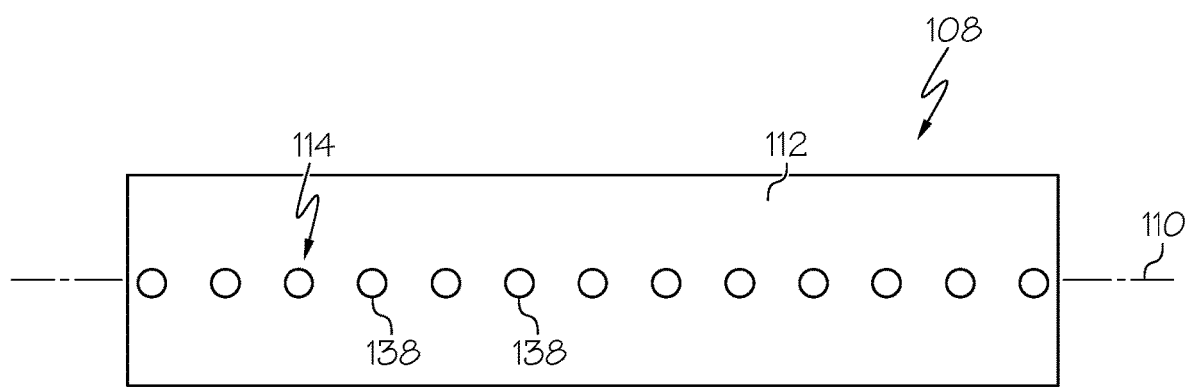
FIG. 9 is a schematic, side elevational view of an example of a roller of the system of FIG. 1.
Figure 10:
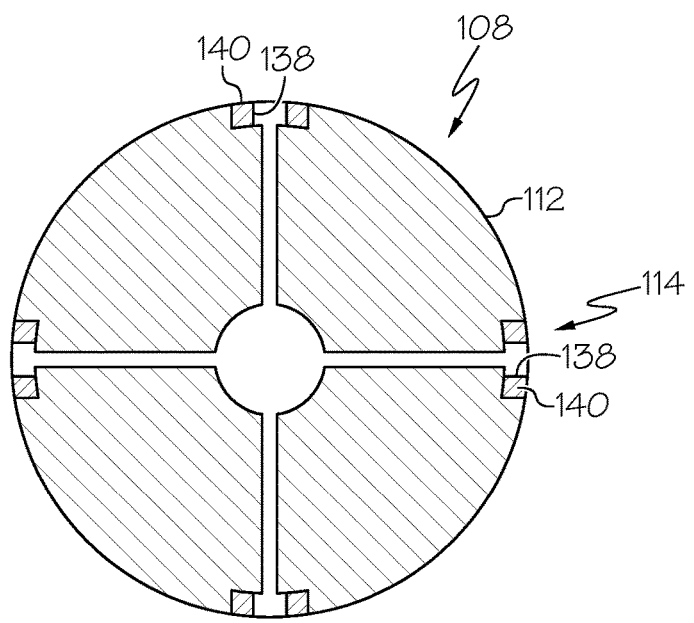
FIG. 10 is a schematic, end elevational view, in section, of an example of the roller of the system of FIG. 1.

Referring to FIG. 1 and to FIGS. 9 and 10, in one or more examples, the adhesion feature 114 includes or takes the form of at least one vacuum port 138. The vacuum port 138 is disposed through the roller surface 112 of the roller 108. In one or more examples, the adhesion feature 114 includes a plurality of vacuum ports 138. The vacuum ports 138 are disposed through the roller surface 112 of the roller 108. The vacuum ports 138 produce a suction capable of temporarily adhering the backing 102 to the roller surface 112 of the roller 108. Additionally, the vacuum ports 138 provide an advantage of being able to reverse the flow of air to release the backing 102 upon removal from the ply 104.

In one or more examples, the system 100 includes a vacuum source 176 (FIG. 1). The vacuum source 176 is any mechanism or device capable of creating a vacuum pressure, such as a vacuum pump. The vacuum source 176 is coupled to roller 108 and is in fluid communication with each one of the vacuum ports 138. As an example, and as illustrated in FIG. 10, the body of the roller 108 may serve as a manifold to transfer the vacuum pressure to the vacuum ports 138.

As illustrated in FIG. 10, in one or more examples, the adhesion feature 114 includes at least one grommet 140. The grommet 140 is located within the vacuum port 138. In one or more examples, one of a plurality of grommets 140 is located within each one of the plurality of vacuum ports 138. The grommet 140 includes a ring or edge strip that is situated within and along a periphery of the vacuum port 138 to assist in creating a seal between the vacuum port 138 and the backing 102 and to increase friction between the roller 108 and the backing 102 to prevent slippage.

In one or more examples, the vacuum port 138 is located at an approximately central location along the length of the roller 108. In these examples, a single vacuum port 138 may be sufficient to generate an adhesion force FA (FIGS. 4 and 5), such as a first adhesion force FA1 (FIGS. 14 and 15), capable to initiating separation of the backing 102 from the ply 104 and a static friction force FSF (FIGS. 4, 5, 14 and 15) capable holding the backing 102 to the roller surface 112.

As illustrated in FIG. 9, in one or more examples, the vacuum ports 138 extend along a length of the roller 108. In these examples, the plurality of vacuum ports 138 may be sufficient to generate the adhesion force FA (FIGS. 4 and 5), such as the first adhesion force FA1 (FIGS. 14 and 15), capable to initiating separation of the backing 102 from the ply 104 and the static friction force FSF (FIGS. 4, 5, 14 and 15) capable holding the backing 102 to the roller surface 112.

As illustrated in FIG. 10, in one or more examples, the vacuum ports 138 extend around a circumference of the roller 108. In these examples, the plurality of vacuum ports 138 may be sufficient to generate the adhesion force FA (FIGS. 4 and 5), such as the first adhesion force FA1 (FIGS. 14 and 15), capable to initiating separation of the backing 102 from the ply 104 and the static friction force FSF (FIGS. 4, 5, 14 and 15) capable holding the backing 102 to the roller surface 112.

The number, size, and arrangement of the vacuum ports 138 may vary depending upon various factors, such as the peel force FP required to remove the backing 102, the airflow delivered from the vacuum source 176, the geometry of the ply 104, and the like. In one or more examples, the vacuum ports 138, extending the length of the roller 108, have a diameter of approximately 0.128 inch and a spacing of 0.5 inch between adjacent vacuum ports 138. In one or more examples, the vacuum ports 138, extending the circumference of the roller 108, are equally angularly displaced from each other (e.g., as shown in FIG. 10). In one or more examples, one or more of the vacuum ports 138 may have a geometry (e.g., diameter) that is different than one or more other ones of the vacuum ports 138. As an example, larger ones of the vacuum ports 138 may be utilized for an initial separation peel of the backing 102 from the ply 104 and smaller ones of the vacuum ports 138 may be utilized for the holding the backing 102 to the roller surface 112 during continued wind-up peeling of the backing 102 away from the ply 104.

Figure 11:
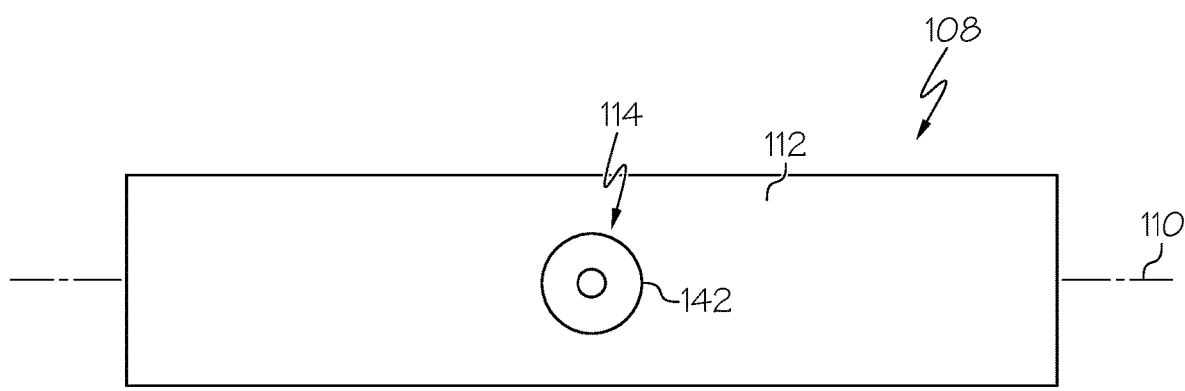
FIG. 11 is a schematic, side elevational view of an example of a roller of the system of FIG. 1.
Figure 12:
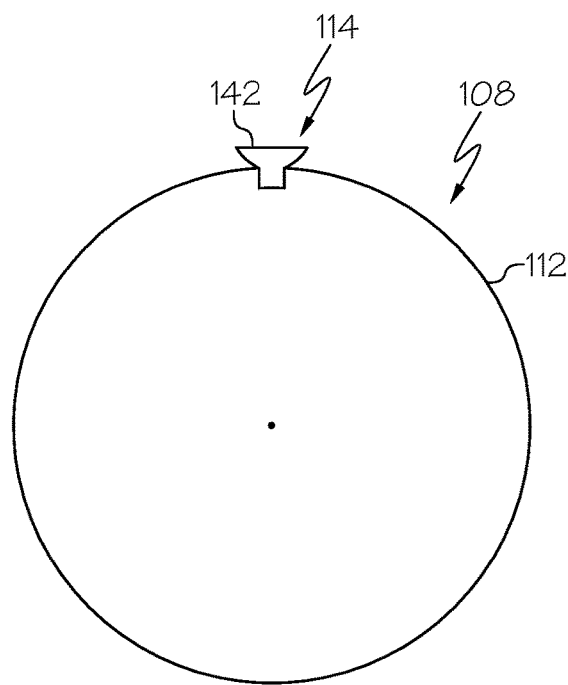
FIG. 12 is a schematic, end elevational view of an example of the roller of the system of FIG. 1.

Referring now to FIG. 1 and to FIGS. 11 and 12, in one or more examples, the adhesion feature 114 includes or takes the form of at least one suction cup 142. The suction cup 142 is disposed on or is coupled to the roller surface 112 of the roller 108. In one or more examples, the adhesion feature 114 includes a plurality of suction cups 142. The suction cups 142 are disposed on or are coupled to the roller surface 112 of the roller 108.

In one or more examples, the suction cup 142 is located at an approximately central location along the length of the roller 108. In one or more examples, the suction cups 142 extend along a length of the roller 108. In one or more examples, the suction cups 142 extend around a circumference of the roller 108. In these examples, one or more suction cups 142 may be sufficient to generate the adhesion force FA (FIGS. 4 and 5), such as the first adhesion force FA1 (FIGS. 14 and 15) capable to initiating separation of the backing 102 from the ply 104 and the static friction force FSF (FIGS. 4, 5, 14 and 15) capable holding the backing 102 to the roller surface 112.

In other examples, the adhesion feature 114 may include or take the form of another type of suitable temporary adhesive structure. As an example, the adhesion feature 114 may include an elongated strip or a series of strips of hook-and-loop fastener. A complementary strip of the hook-and-loop fastener is attached to the first backing surface 120 of the backing 102 at an initial separation region.

Referring now to FIG. 1 and to FIGS. 4 and 5, in one or more examples, the system 100 includes a support platform 130. The support platform 130 includes a support surface 144 (FIGS. 4 and 5). The support surface 144 supports the ply 104 opposite the roller 108.

In one or more examples, the support platform 130 includes a second adhesion feature 146 (FIGS. 4 and 5). The second adhesion feature 146 is disposed on the support surface 144. During removal of the backing 102 from the ply 104, the support platform 130 holds the ply 104 in position using the second adhesion features 146.

As illustrated in FIGS. 4 and 5, in one or more examples, the support platform 130 includes or takes the form of a vacuum table 148. In these examples, the second adhesion feature 146 includes or takes the form of a plurality of second vacuum ports 160. The second vacuum ports 160 are disposed or otherwise formed through the support surface 144. The second vacuum ports 160 are suitably distributed across the support surface 144 to retain the ply 104 to the support surface 144.

Figure 2:
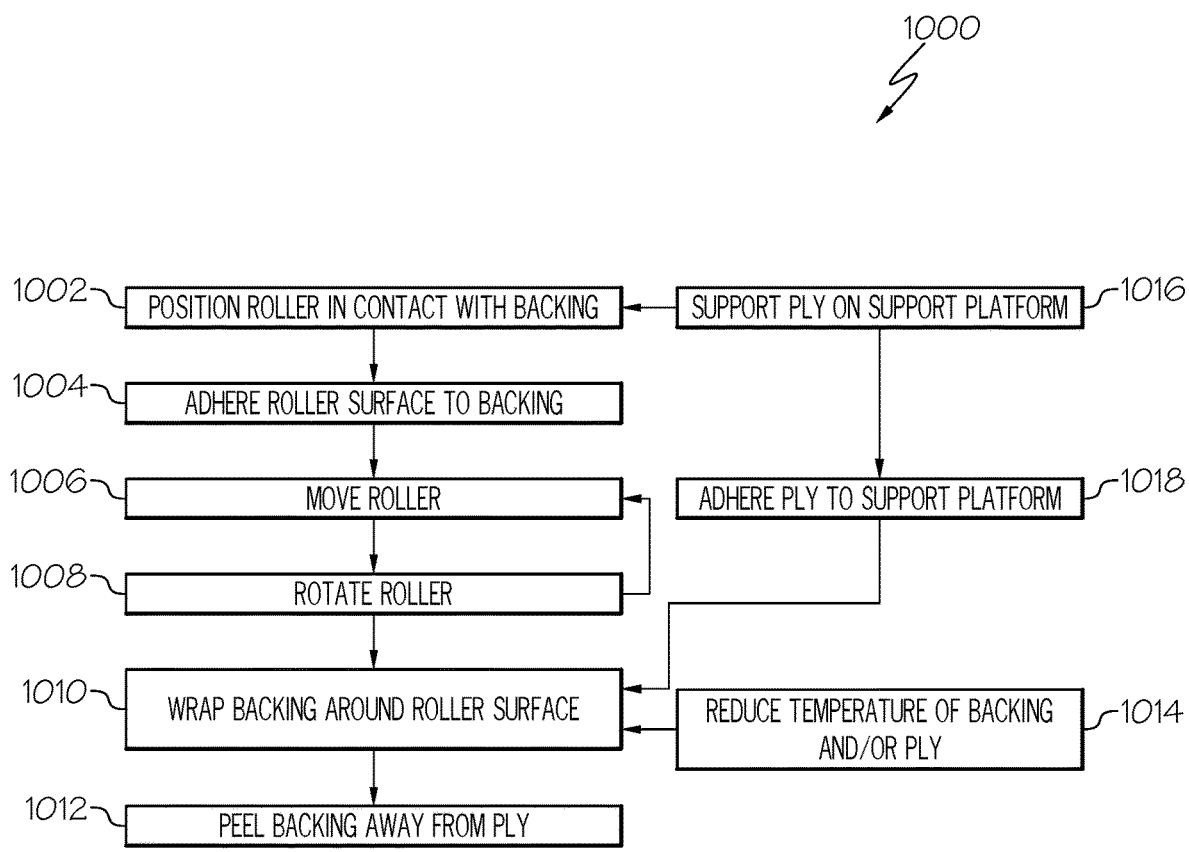
FIG. 2 is a flow diagram of an example of a method for removing a backing from a ply of composite material.

Referring now to FIG. 2, which illustrates an example of the method 1000 for removing the backing 102 from the ply 104 of the composite material 106. In one or more examples, the method 1000 is implemented using the system 100 (FIG. 1).

Referring to FIG. 2 and to FIGS. 1 and 4-6, in one or more examples, the method 1000 includes a step of (block 1002) positioning the roller 108 in contact with the backing 102. The method 1000 includes a step of (block 1004) adhering the roller surface 112 of the roller 108 to a portion of the backing 102. The method 1000 includes a step of (block 1006) moving the roller 108 along the travel path 118 and a step of (block 1008) rotating the roller 108 about the roller axis 110. Generally, the step of (block 1006) moving the roller 108 along the travel path 118 and the step of (block 1008) rotating the roller 108 occur concurrently. The method 1000 includes a step of (block 1010) wrapping the backing 102 around the roller surface 112 and a step of (block 1012) peeling the backing 102 away from the ply 104.

In one or more examples, the method 1000 includes a step of (block 1014) reducing a temperature 178 of at least one of the backing 102 and/or the ply 104. Generally, the step of (block 1014) reducing the temperature 178 is performed prior to (before) and/or during the step of (block 1010) wrapping the backing 102 around the roller surface 112 and the step of (block 1012) peeling the backing 102 away from the ply 104.

Referring to FIG. 2 and to FIGS. 1, 7 and 8, in one or more examples, according to the method 1000, the step of (block 1014) reducing the temperature 178 of the backing 102 and/or the ply 104 includes a step of dispensing the chilled gas 126 from the gas discharge device 124 (e.g., as shown in FIGS. 7 and 8).

As illustrated in FIGS. 7 and 8, in one or more examples, the method 1000 includes a step of moving the gas discharge device 124 along the travel path 118 ahead of the roller 108 such that the chilled gas 126 is dispensed along the contact interface 128 between the roller surface 112 of the roller 108 and the first backing surface 120 of the backing 102.

Referring to FIG. 2 and to FIGS. 1 and 4-8, in one or more examples, according to the method 1000, the step of (block 1004) adhering the roller surface 112 of the roller 108 to a portion of the backing 102 includes a step of procuring adhesion 180 (FIGS. 6-8) between the roller surface 112 and the first backing surface 120 of the backing 102 using the adhesion feature 114 disposed on the roller surface 112.

Referring to FIG. 2 and to FIGS. 1, 9 and 10, in one or more examples, according to the method 1000, the step of procuring adhesion 180 between the roller surface 112 and the first backing surface 120 includes a step of applying a suction to a portion of the first backing surface 120 and creating vacuum through at least one vacuum port 138 disposed through the roller surface 112.

In one or more examples, according to the method 1000, the step of procuring adhesion 180 between the roller surface 112 and the first backing surface 120 includes a step of applying a suction to a portion of the first backing surface 120 using at least one suction cup 142 disposed on the roller surface 112.

Referring to FIG. 2 and to FIGS. 13A-13G, in one or more examples, according to the method 1000, the step of (block 1002) positioning the roller 108 includes a step of positioning the roller 108 at an exterior corner 152 of the backing 102. The step of (block 1004) adhering the roller surface 112 of the roller 108 to a portion of the backing 102 includes a step of adhering a portion of the roller surface 112 to the exterior corner 152 of the backing 102.

In one or more examples, according to the method 1000, the step of (block 1002) positioning the roller 108 includes a step of orienting the roller 108 relative to the ply 104 such that the travel path 118 is oblique to an edge 150 of the backing 102.

In one or more examples, the edge 150 of the backing 102 is a perimeter edge 154 of the backing 102. In one or more examples, the edge 150 of the backing 102 forms a portion of an interior corner 156 of the backing 102.

As illustrated in FIGS. 13A-13G, the ply 104 and, thus, the backing 102 may have any one of various two-dimensional geometries or peripheral shapes. Positioning the roller 108 at the exterior corner 152 such that the travel path 118 is oblique to the edge 150 (e.g., the perimeter edge 154 and/or an interior corner 156) reduces the likelihood of tearing the backing 102 during removal.

Additionally, starting at the corner 152 is beneficial as it has less surface area to initially break the backing 102 away from ply 104. The travel path 118 advantageously does not go parallel or perpendicular to an edge of an interior corner, a break, or a bend feature of ply 104 and the backing 102, thus, avoiding edges that are perpendicular to the peel path to avoid tearing issues.

Referring to FIG. 2 and to FIGS. 1, 4 and 5, in one or more examples, the method 1000 includes a step of (block 1016) supporting the ply 104 on the support platform 130 opposite the roller 108.

In one or more examples, the method 1000 includes a step of (block 1018) adhering the ply 104 to the support platform 130. Generally, the step of (block 1018) adhering the ply 104 to the support platform 130 is performed prior to and/or or during step of (block 1010) wrapping the backing 102 around the roller surface 112 and the step of (block 1012) peeling the backing 102 away from the ply 104.

Figure 3:
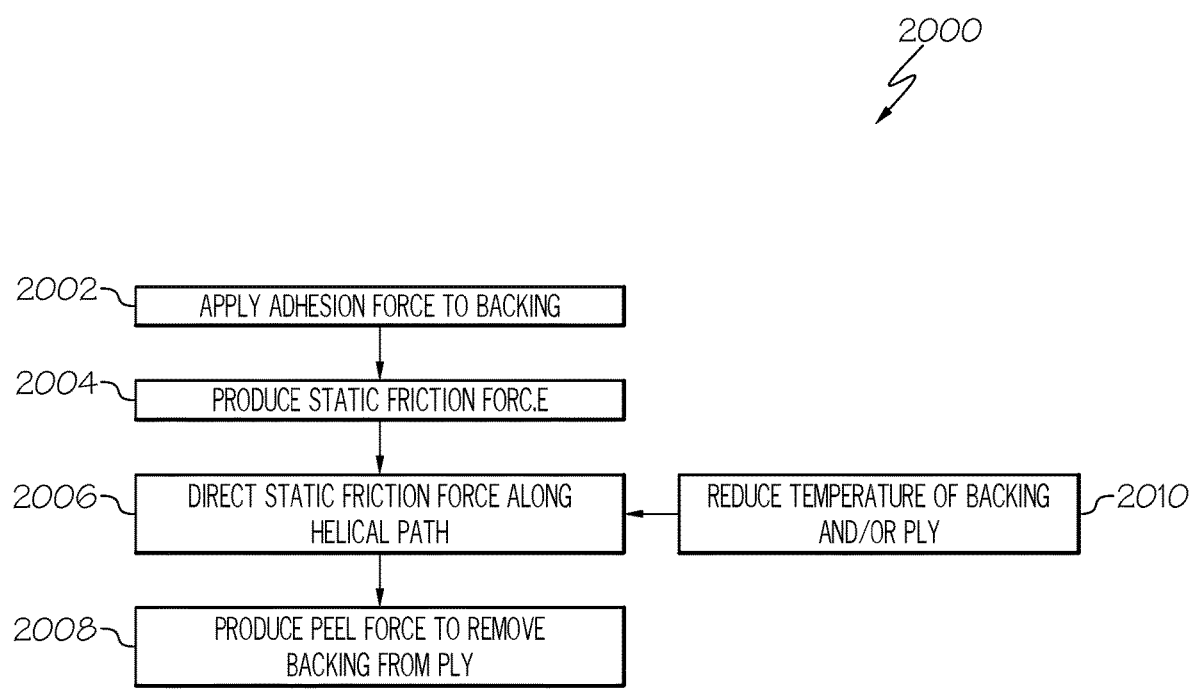
FIG. 3 is a flow diagram of an example of the method for removing a backing from a ply of composite material.

Referring now to FIG. 3, which illustrates an example of the method 2000 for removing the backing 102 from the ply 104 of the composite material 106. In one or more examples, the method 2000 is implemented using the system 100 (FIG. 1).

Referring to FIG. 3 and to FIGS. 1, 4, 5, 14 and 15, in one or more examples, the method 2000 includes a step of (block 2002) applying the adhesion force FA (FIGS. 4 and 5) to the first backing surface 120 of the backing 102. In the example illustrated in FIGS. 14 and 15, the first adhesion force FA1 is applied to the first backing surface 120A of the first backing 102A by the adhesion feature 114 of the roller 108.

In one or more examples, the method 2000 includes a step of (block 2004) producing a static friction force FSF, applied to the first backing surface 120, via the adhesion force FA. In the example illustrated in FIGS. 14 and 15, the static friction force FSF is produced between the roller surface 112 and the first backing surface 120A of the first backing 102A in proportional response to the first adhesion force FA1.

In one or more examples, the method 2000 includes a step of (block 2006) directing the static friction force FSF along a cycloidal path. The static friction force FSF moves along the cycloidal path in response to rotation of the roller 108 about the roller axis 110.

In one or more examples, the method 2000 includes a step of (block 2008) producing the peel force FP (FIGS. 5 and 15), applied to the backing 102, via the adhesion force FA (FIGS. 4 and 5), such as the first adhesion force FA1 (FIGS. 14 and 15), and the static friction force FSF. The peel force FP is sufficient to remove the backing 102 from the ply 104.

In one or more examples, the method 2000 includes a step of (block 2010) reducing a temperature 178 of at least one of the backing 102 and/or the ply 104 at an area upon which the peel force FP is applied.

Figure 14:
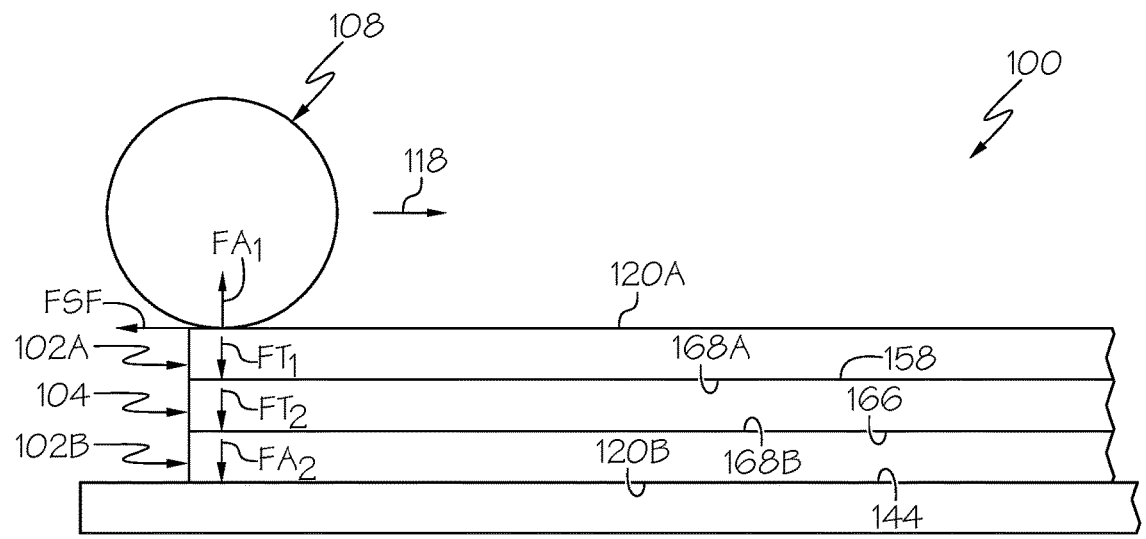
FIG. 14 is a schematic, side view of an example of the system of FIG. 1.
Figure 15:
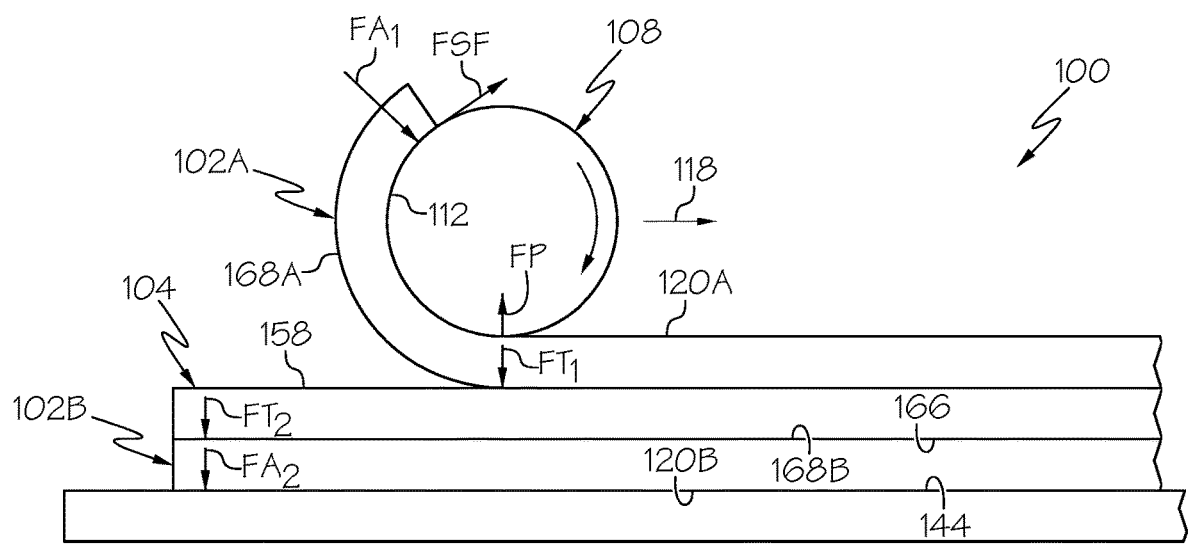
FIG. 15 is a schematic, side view of an example of the system of FIG. 1.

In one or more examples, as illustrated in FIGS. 14 and 15, the method 2000 also includes a step of applying a second adhesion force FA2 to the first backing surface 120B of the second backing 102B. In the example illustrated in FIGS. 14 and 15, a second adhesion force FA2 is applied to the first backing surface 120B of the second backing 102B by the second adhesion features 146 of the support platform 130.

In one or more examples, during removal of the first backing 102A from the first ply surface 158 of the ply 104, the peel force FP is greater than the first tack force FT1 between the second backing surface 168A of the first backing 102A and the first ply surface 158 of the ply 104. The first adhesion force FA1 is greater than the static friction force FSF. A second adhesion force FA2 between the support surface 144 and the first backing surface 120B of the second backing 102B is greater than a second tack force FT2 between the second ply surface 166 of the ply 104 and the second backing surface 168B of the second backing 102B. The second adhesion force FA2 between the support surface 144 and the first backing surface 120B of the second backing 102B is greater than peel force FP. Generally, it is desirable to maximize the static friction force FSF and the second adhesion force FA2.

It can be appreciated that the various forces at play during removal of the backing 102 from the ply 104 can be impacted by a number of different factors. As an example, the first adhesion force FA1 can be impacted by the level of the vacuum applied; the geometry, number, and arrangement of the vacuum ports 138; a quality of the seal created between the roller 108 and the backing 102, atmospheric pressure, and the like. As another example, the static friction force FSF can be impacted by the material of the roller 108, the material of the grommet 140, the first adhesion force FA1, and the like. As another example, the peel force FP can be impacted by the torque of the roller 108, the diameter of the roller 108, and the like. As another example, the tack force FT can be impacted by the material (e.g., matrix 164) type, temperature, time, and the like. As another example, the second adhesion force FA2 can be impacted by the type of vacuum table, the tack force FT, and the like.

While not explicitly illustrated herein, the system 100, the method 1000, and the method 2000 can be utilized to remove the backing 102 from both sides or surfaces of the ply 104. As an example, the first backing 102A can be removed from the ply 104 as described herein and illustrated by example in FIGS. 4-15. After removal of the first backing 102A, the ply 104 can be removed from the support platform 130 and/or reoriented for removal of the second backing 102B. The process described herein can be repeated to remove the second backing 102B in a substantially similar manner as that of the first backing 102A.

Accordingly, the system 100, the method 1000, and the method 2000 disclosed herein provide a unique solution for removing the backing 102 from the ply 104 of the composite material 106 by utilizing the roller 108 to grab the corner 152 of the backing 102 and roll-up the backing 102 to peel the backing 102 away from the ply 104 and the cooling device 122 to reduce the temperature 178 of the ply 104 and, thus, the tack force between the ply 104 and the backing 102.

The system 100, the method 1000, and the method 2000 disclosed herein advantageously provide a sufficiently strong peel force (e.g., peel force FP shown in FIGS. 14 and 15) for removing the backing 102 without disturbing the location of the ply 104, application to various geometries of the ply 104 and the backing 102 (e.g., as shown in FIGS. 13A-13G) without tearing the backing 102 or damaging the ply 104, and repeatability by accounting for various process variables.

Figure 16:
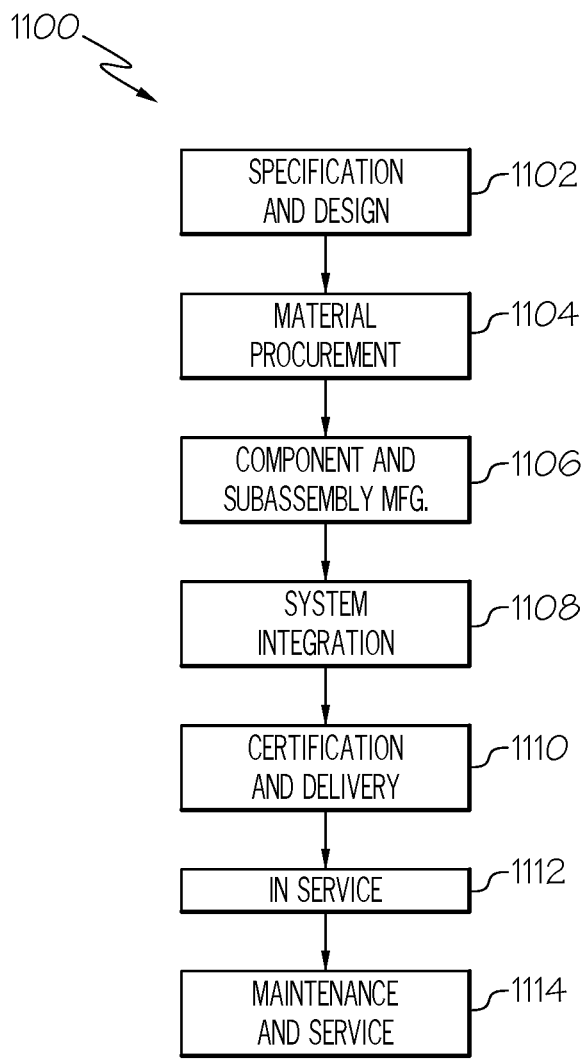
FIG. 16 is a flow diagram of an example of an aircraft manufacturing and service method.
Figure 17:
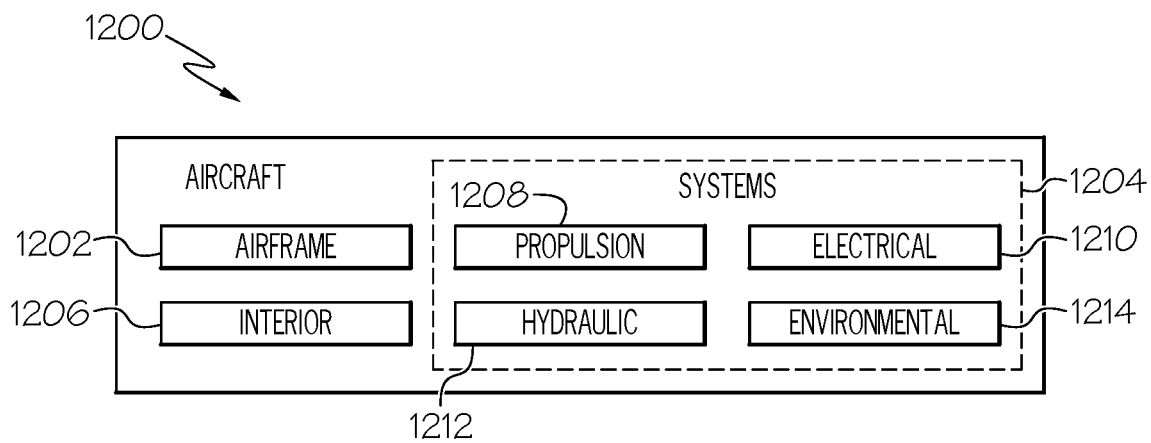
FIG. 17 is a schematic block diagram of an example of an aircraft.

Referring now to FIGS. 16 and 17, examples of the system 100, the method 1000, and the method 2000 described herein, may be related to, or used in the context of, an aircraft manufacturing and service method 1100, as shown in the flow diagram of FIG. 16 and an aircraft 1200, as schematically illustrated in FIG. 17. For example, the aircraft 1200 and/or the aircraft production and service method 1100 may utilize composite structures fabricated from a pre-preg layup in which a backing material is removed from each ply of the lay-up using the system 100 and/or according to the method 1000 or the method 2000.

Referring to FIG. 17, which illustrates an example of the aircraft 1200. The aircraft 1200 also includes an airframe 1202 having an interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to an airframe 1202 of the aircraft 1200, such as for example, flaps, spoilers, ailerons, slats, rudders, elevators, and trim tabs. In yet other examples, the onboard systems 1204 also includes one or more other systems, such as, but not limited to, communications systems, avionics systems, software distribution systems, network communications systems, passenger information/entertainment systems, guidance systems, radar systems, weapons systems, and the like. The aircraft 1200 may include various composite structures, for example, that form a portion of the airframe 1202, the interior 1206, and/or one or more of the onboard systems 1204. These composite structures may be fabricated from a pre-preg layup in which a backing material is removed from each ply of the lay-up using the system 100 and/or according to the method 1000 or the method 2000.

Referring to FIG. 16, during pre-production of the aircraft 1200, the aircraft manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the aircraft manufacturing and service method 1100 illustrated in FIG. 16 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the system 100, the method 1000, and the method 2000 shown and described herein, may be employed during any one or more of the stages of the aircraft manufacturing and service method 1100 shown in the flow diagram illustrated by FIG. 16. In an example, removal of backing material from plies of composite materials using the system 100 and/or according to the method 1000 or the method 2000 may form a portion of component and subassembly manufacturing (block 1106) and/or system integration (block 1108). Further, removal of backing material from plies of composite materials using the system 100 and/or according to the method 1000 or the method 2000 may be implemented in a manner similar to components or subassemblies prepared while the aircraft 1200 is in service (block 1112). Also, removal of backing material from plies of composite materials using the system 100 and/or according to the method 1000 or the method 2000 may be utilized during system integration (block 1108) and certification and delivery (block 1110). Similarly, removal of backing material from plies of composite materials using the system 100 and/or according to the method 1000 or the method 2000 may be utilized, for example and without limitation, while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1, 4-15 and 17, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1, 4-15 and 17, referred to above, need be included in every example and not all elements, features, and/or components described herein are necessarily depicted in each illustrative example. Accordingly, some of the elements, features, and/or components described and illustrated in FIGS. 1, 4-15 and 17 may be combined in various ways without the need to include other features described and illustrated in FIGS. 1, 4-15 and 17, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1, 4-15 and 17, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1, 4-15 and 17, and such elements, features, and/or components may not be discussed in detail herein with reference to each of FIGS. 1, 4-15 and 17. Similarly, all elements, features, and/or components may not be labeled in each of FIGS. 1, 4-15 and 17, but reference numerals associated therewith may be utilized herein for consistency.

In FIGS. 2, 3 and 16, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 2, 3 and 16 and the accompanying disclosure describing the operations of the disclosed methods set forth herein should not be interpreted as necessarily determining a sequence in which the operations are to be performed.

Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100, the method 1000, and the method 2000 have been shown and described, modifications may occur to those skilled in the art upon reading the specification. The present application includes such modifications and is limited only by the scope of the claims.

What is claimed is:

1. A system for removing a backing from a ply of composite material, the system comprising:
   a roller comprising a roller axis and a roller surface that circumscribes the roller axis;
   an adhesion feature disposed on the roller surface;
   a roller drive to move the roller along a travel path that is perpendicular to the roller axis and to rotate the roller about the roller axis; and
   a cooling element that moves along the travel path to reduce a temperature of at least one of the backing and the ply ahead of the roller.

2. The system of claim 1, wherein:
   the roller surface is configured to contact a backing surface of the backing;
   the adhesion feature is configured to procure adhesion between the roller surface and a portion of the backing surface; and
   rotation of the roller during movement of the roller along the travel path peels the backing away from the ply.

3. The system of claim 2, wherein the roller drive is configured to apply a first force to the roller, perpendicular to the roller axis, and to apply a second force to the roller, perpendicular to the roller axis and to the first force.

4. The system of claim 1, wherein the cooling element is located adjacent to the roller.

5. The system of claim 1, wherein the cooling element comprises a gas dispenser that dispenses a gas along a contact interface between the roller surface of the roller and a backing surface of the backing.

6. The system of claim 5, wherein the gas dispenser comprises a nozzle.

7. The system of claim 5, wherein the gas dispenser comprises a diffuser.

8. The system of claim 1, wherein the adhesion feature comprises at least one vacuum port disposed through the roller surface of the roller.

9. The system of claim 1, wherein the adhesion feature comprises a plurality of vacuum ports disposed through the roller surface of the roller.

10. The system of claim 9, wherein the vacuum ports extend along a length of the roller.

11. The system of claim 9, wherein the vacuum ports extend around a circumference of the roller.

12. The system of claim 1, wherein the adhesion feature comprises at least one suction cup.

13. The system of claim 1, further comprising a support platform comprising a support surface,
   wherein:
      the support surface supports the ply opposite the roller; and
      the support platform comprises a second adhesion feature disposed on the support surface.

14. A method for removing a backing from a ply of composite material, the method comprising steps of:
   positioning a roller in contact with the backing;
   adhering a roller surface of the roller to a portion of the backing;
   moving the roller along a travel path while rotating the roller about a roller axis;
   moving a cooling element along the travel path to reduce a temperature of at least one of the backing and the ply ahead of the roller; and
   wrapping the backing around the roller surface to peel the backing away from the ply.

15. The method of claim 14, wherein:
   the cooling element comprises a gas dispenser; and
   the step of moving the cooling element along the travel path comprises dispensing a chilled gas from the gas dispenser along a contact interface between the roller surface of the roller and a backing surface of the backing.

16. The method of claim 15, further comprising one of increasing or decreasing a velocity of the gas.

17. The method of claim 14, wherein the step of adhering the roller surface of the roller to a portion of the backing comprises a step of procuring adhesion between the roller surface and a backing surface of the backing using an adhesion feature disposed on the roller surface.

18. The method of claim 14, wherein:
   the step of positioning the roller comprises:
      positioning the roller at a corner of the backing; and
      orienting the roller relative to the ply such that the travel path is oblique to an edge of the backing; and
   the step of adhering the roller surface of the roller to a portion of the backing comprising adhering a portion of the roller surface to the corner of the backing.

19. The method of claim 14, further comprising:
   supporting the ply on a support platform opposite the roller; and,
   adhering the ply to the support platform during the step of wrapping the backing around the roller surface.

20. A method removing a backing from a ply of composite material, the method comprising steps of:
   applying an adhesion force to a backing surface of the backing;
   producing a static friction force applied to the backing surface via the adhesion force;
   directing the static friction force along a cycloidal path;

producing a peel force applied to the backing via the adhesion force and the static friction force, wherein peel force is sufficient to remove the backing from the ply; and cooling at least one of the backing and the ply to reduce a temperature of an area upon which the peel force is applied along a travel path that is approximately perpendicular to the peel force.

* * * * *